(12) United States Patent
Lu

(10) Patent No.: US 10,839,129 B2
(45) Date of Patent: Nov. 17, 2020

(54) CHARACTERIZATION OF SPATIAL CORRELATION IN INTEGRATED CIRCUIT DEVELOPMENT

(71) Applicant: International Business Machines Corporation, Armonk, NY (US)

(72) Inventor: Ning Lu, Essex Junction, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/274,522

(22) Filed: Feb. 13, 2019

(65) Prior Publication Data

US 2020/0257769 A1 Aug. 13, 2020

(51) Int. Cl.
| | |
|---|---|
| *G06F 30/39* | (2020.01) |
| *G06F 17/17* | (2006.01) |
| *G06F 30/3312* | (2020.01) |
| *G06F 111/08* | (2020.01) |
| *G06F 119/12* | (2020.01) |

(52) U.S. Cl.
CPC ............ *G06F 30/39* (2020.01); *G06F 17/175* (2013.01); *G06F 30/3312* (2020.01); *G06F 2111/08* (2020.01); *G06F 2119/12* (2020.01)

(58) Field of Classification Search
USPC ........................................................ 716/112
See application file for complete search history.

(56) References Cited

U.S. PATENT DOCUMENTS

| | | | |
|---|---|---|---|
| 7,212,946 B1 | 5/2007 | Venkateswaran et al. | |
| 7,689,954 B2 | 3/2010 | Zhang et al. | |
| 8,290,761 B1 | 10/2012 | Singhee et al. | |
| 8,423,328 B2 | 4/2013 | Cohn et al. | |

(Continued)

FOREIGN PATENT DOCUMENTS

CN 101996266 B 10/2013

OTHER PUBLICATIONS

Chen et al., "Static Timing: Back to Our Roots", IEEE 2008, pp. 1-6.

(Continued)

*Primary Examiner* — Mohammed Alam
(74) *Attorney, Agent, or Firm* — Cantor Colburn LLP; Erik Johnson

(57) ABSTRACT

Systems and methods for applying spatial correlation in integrated circuit development involve placing devices of an integrated circuit design, and obtaining spatial correlation values. Each spatial correlation value indicates a correlation coefficient between a first device and a second device, which are instances of a same device. The correlation coefficient is based on a device separation. Spatial correlation is determined as a function of an inverse of device separation. The device separation refers to one-dimensional or two-dimensional separation. The method includes determining a parameter value for the first device based on an average value of the parameter value and on the spatial correlation as the function of the inverse of the device separation, performing analysis of the integrated circuit design using the parameter value, and providing the integrated circuit design for fabrication into an integrated circuit based on finalizing the design according to the analysis.

17 Claims, 7 Drawing Sheets

(56) References Cited

U.S. PATENT DOCUMENTS

| | | | |
|---|---|---|---|
| 8,631,369 B1 | 1/2014 | Kariat et al. | |
| 8,903,697 B2 | 12/2014 | Trombley et al. | |
| 8,930,171 B2 | 1/2015 | Lu | |
| 9,760,667 B1 | 9/2017 | Levitsky et al. | |
| 2009/0204365 A1* | 8/2009 | Lu | G06F 30/20 702/179 |
| 2010/0058258 A1* | 3/2010 | Do | G06F 30/367 716/136 |
| 2011/0219344 A1* | 9/2011 | Heng | G06F 30/00 716/103 |
| 2012/0124530 A1* | 5/2012 | Lu | G06F 30/392 716/55 |
| 2013/0179127 A1* | 7/2013 | Lu | G06F 30/367 703/2 |
| 2017/0316138 A1 | 11/2017 | Chiang et al. | |

OTHER PUBLICATIONS

Cheng et al., "Non-Gaussian Statistical Timing Analysis Using Second-Order Polynomial Fitting", IEEE Transactions on Computer-Aided Design of Integrated Circuits and Systems, vol. 28, No. 1, Jan. 2009, pp. 130-140.

Cline et al., "Analysis and Modeling of CD Variation for Statistical Static Timing", ICCAD, Nov. 5-9, 2006, pp. 60-66.

Gunaratna et al., "Spatial Autocorrelation", pp. 1-14, retrieved Aug. 3, 2018, retrieved from http://www.stat.purdue.edu/~bacraig/SCS/Spatial%20Correlation%20new.doc.

Lu et al., "Experiment and Model for Distance-Dependent Mismatch", TechConnect Briefs, 2018, pp. 228-231.

Singh et al., "Statistical Timing Analysis with Correlated Non-Gaussian Parameters using Independent Component Analysis", DAC 2006, Jul. 24-28, 2006, pp. 155-160.

Singhee et al., "Exploiting Correlation Kernels for Efficient Handling of Intra-Die Spatial Correlation, with Application to Statistical Timing", EDAA, 2008, pp. 1-6.

Singhee et al., "Practical, Fast Monte Carlo Statistical Static Timing Analysis: Why and How", ICCAD, 2008. pp. 1-6.

Xiong et al., "Efficient Modeling of Spatial Correlations for Parameterized Statistical Static Timing Analysis", IEEE 2009, pp. 722-725.

Xiong et al., "Robust Extraction of Spatial Correlation", IEEE Transactions on Computer-Aided Design of Integrated Circuits and Systems, vol. 26, No. 4, Apr. 2007, pp. 619-631.

\* cited by examiner

CHARACTERIZATION OF SPATIAL CORRELATION IN INTEGRATED CIRCUIT DEVELOPMENT

BACKGROUND

The present invention relates to integrated circuit development, and more specifically, to the characterization of spatial correlation in integrated circuit development.

The generation of an integrated circuit (i.e., chip) involves a number of phases including the high-level logic design, logic synthesis, physical synthesis, routing, and manufacturing phases. Each of the phases can include multiple processes that can be performed iteratively. An electronic design automation (EDA) tool can be used to perform many of the processes such as processes that are part of the logic synthesis and physical synthesis phases. The logic design can provide a register transfer level (RTL) description. The physical synthesis phase includes identifying and placing components (referred to generally as devices), such as gate logic, to implement the logic design. A netlist can be produced to indicate the interconnections among devices. In the routing phase, the placement of wires that connect gates and other devices in the netlist is defined, and in the manufacturing phase, the finalized design is provided for physical implementation of the chip. In addition to functional requirements, an integrated circuit must typically also meet performance, timing, and power constraints.

SUMMARY

Embodiments of the present invention are directed to systems and methods to apply spatial correlation in integrated circuit development. The method includes placing devices of an integrated circuit design, and obtaining spatial correlation values, each spatial correlation value indicating a correlation coefficient between a first device and a second device among the devices. The first device and the second device are instances of a same device and the correlation coefficient is based on a device separation between the first device and the second device. The method also includes determining spatial correlation as a function of an inverse of device separation by integrating over the device separation with an integrand being a product of the spatial correlation values in the space of the device separation and a trigonometric function whose argument is a product of the device separation and a parameter representing the inverse of the device separation. The device separation refers to one-dimensional or two-dimensional separation. The method additionally includes determining a parameter value for the first device based on an average value of the parameter value and on the spatial correlation as the function of the inverse of the device separation, performing analysis of the integrated circuit design using the parameter value, and providing the integrated circuit design for fabrication into an integrated circuit based on finalizing the design according to the analysis.

BRIEF DESCRIPTION OF THE DRAWINGS

The examples described throughout the present document will be better understood with reference to the following drawings and description. The devices in the figures are not necessarily to scale. Moreover, in the figures, like-referenced numerals designate corresponding parts throughout the different views.

DETAILED DESCRIPTION

Figure 1:
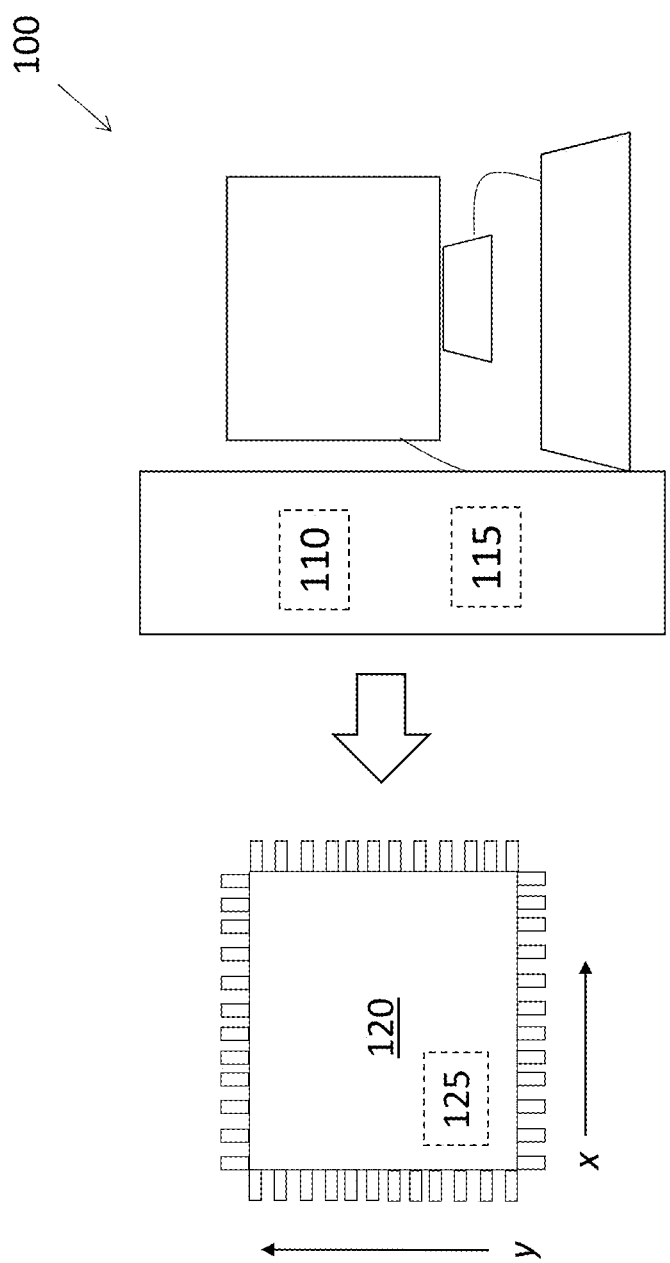
FIG. 1 is a block diagram of a system to characterize spatial correlation in integrated circuit development according to one or more embodiments of the invention.

As previously noted, integrated circuit development involves multiple stages from the design through the fabrication. Before a final design is fabricated, analyses and tests are used to ensure that the design meets all requirements such as, for example, noise, power consumption, and timing requirements. For example, timing analysis is performed at different stages of integrated circuit development to ensure that the integrated circuit (i.e., chip) that is fabricated from the final design will meet timing requirements. Tests directed to power consumption and noise are also performed. Timing analysis generally refers to analyzing the delay associated with processing or transmitting a signal from one device to another (i.e., from a source to a sink) and determining if the signal reaches the sink within the required arrival time (RAT). In order to perform timing analysis, a timing graph may be developed with each device (e.g., logic gate, buffer) indicated as a node and each interconnect, which represents a wire, indicated as an edge. The delay associated with each node and edge must be known or modeled.

The proximity of some nodes can affect physical or electrical parameters (e.g., the threshold voltage of a transistor, the channel length of a transistor, the switching delay of an inverter, the switching delay of a NAND gate, the switching delay of a NOR gate) associated with those nodes. For example, identically designed ring oscillators may be used in different parts of an integrated circuit. The correlation coefficient of a given ring oscillator with another ring oscillator is typically between 0 and 1, with the value being closer to 1 with the proximity of the ring oscillators. Thus, the correlation coefficient between two ring oscillators affects the delay difference between the ring oscillators. Since the correlation coefficient between two ring oscillators varies with the distance between them, the delay difference between two ring oscillators depends on the relative distance between the two ring oscillators.

In a fabricator, the delay can be measured such that the correlation coefficient can be determined. In the process of developing an integrated circuit for the fabricator, the spatial correlation represented by the correlation coefficient values must be characterized in a way that they can be used for timing analysis. Specifically, the range for the delay (i.e., minimum to maximum delay) is affected by the spatial correlation. As previously noted, the delay is only one manifestation of the physical and electrical parameters that are affected by spatial correlation. Embodiments of the invention involve the characterization of spatial correlation in integrated circuit development. Specifically, given a discrete or continuous arbitrary spatial correlation relation, parameter ranges can be obtained based on determining a corresponding spatial correlation as a function of the inverse of device separation, i.e., based on determining a corresponding spatial correlation in the space of the inverse of device separation.

FIG. 1 is a block diagram of a system 100 to characterize spatial correlation in integrated circuit development according to one or more embodiments of the invention. The system 100 includes processing circuitry 110 and memory 115 that is used to generate the design that is ultimately fabricated into an integrated circuit 120. An exemplary x and y-axis are indicated with respect to the integrated circuit 120 for explanatory purposes, and an exemplary device 125 (e.g., logic gate, ring oscillator, buffer) is shown positioned at an (x, y) location. The steps involved in the fabrication of the integrated circuit 120 are briefly described herein and with reference to FIG. 7. The design is finalized, in part, based on the characterization of spatial correlation among devices 125 for use in timing analysis according to embodiments of the invention. The finalized physical layout is provided to a semiconductor manufacturer (e.g., a foundry). Masks are generated for each layer of the integrated circuit 120 based on the finalized physical layout. Then, the wafer is processed in the sequence of the mask order. The processing includes photolithography and etch. The fabrication is further discussed with reference to FIG. 7.

Figure 2:
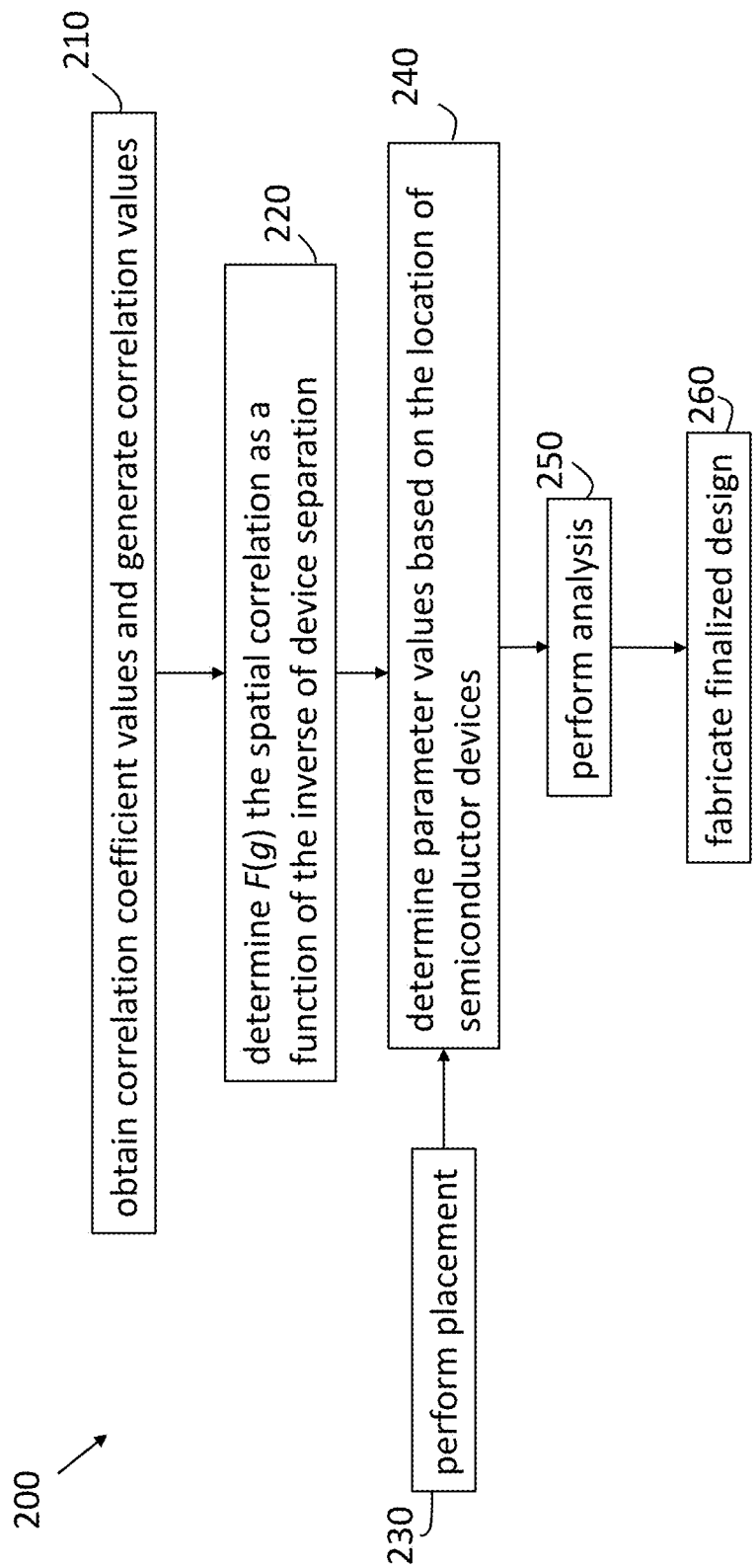
FIG. 2 is a process flow of a method of characterizing spatial correlation in integrated circuit development according to one or more embodiments of the invention.

FIG. 2 is a process flow 200 of a method of characterizing spatial correlation in integrated circuit development according to one or more embodiments of the invention. At block 210, obtaining correlation coefficient values and generating spatial correlation values includes obtaining the values of correlation coefficients among physical or electrical parameters of devices 125 (e.g., semiconductor devices, logic gates) as a function of the separation between them. Generating spatial correlation values refers to generating a continuous relation of spatial correlation (i.e., the correlation coefficient as a function of device distance) or a set of discrete correlation values. Discrete spatial correlation values refer to those that are defined only for a finite number of grid point locations within the integrated circuit.

At block 220, the processes include determining a corresponding spatial correlation as a function of the inverse of device separation, F(g). That is, F(g) is the form of the spatial correlation in the space g of the inverse of device separation u. Performing placement, at block 230, includes determining one or two-dimensional locations of interest. Based on the spatial correlation in the space of the inverse of device separation F(g) (block 220) and the location (block 230), the processes can include determining parameter values P based on location, at block 240. That is, the variation on parameter value based on location can be determined. At block 250, performing analysis can include performing timing analysis, noise analysis, performance analysis, power consumption analysis or any other assessment of the integrated circuit design using the parameter values determined at block 240. At block 260, fabricating the finalized design is according to processes discussed with reference to FIG. 7.

Figure 3:
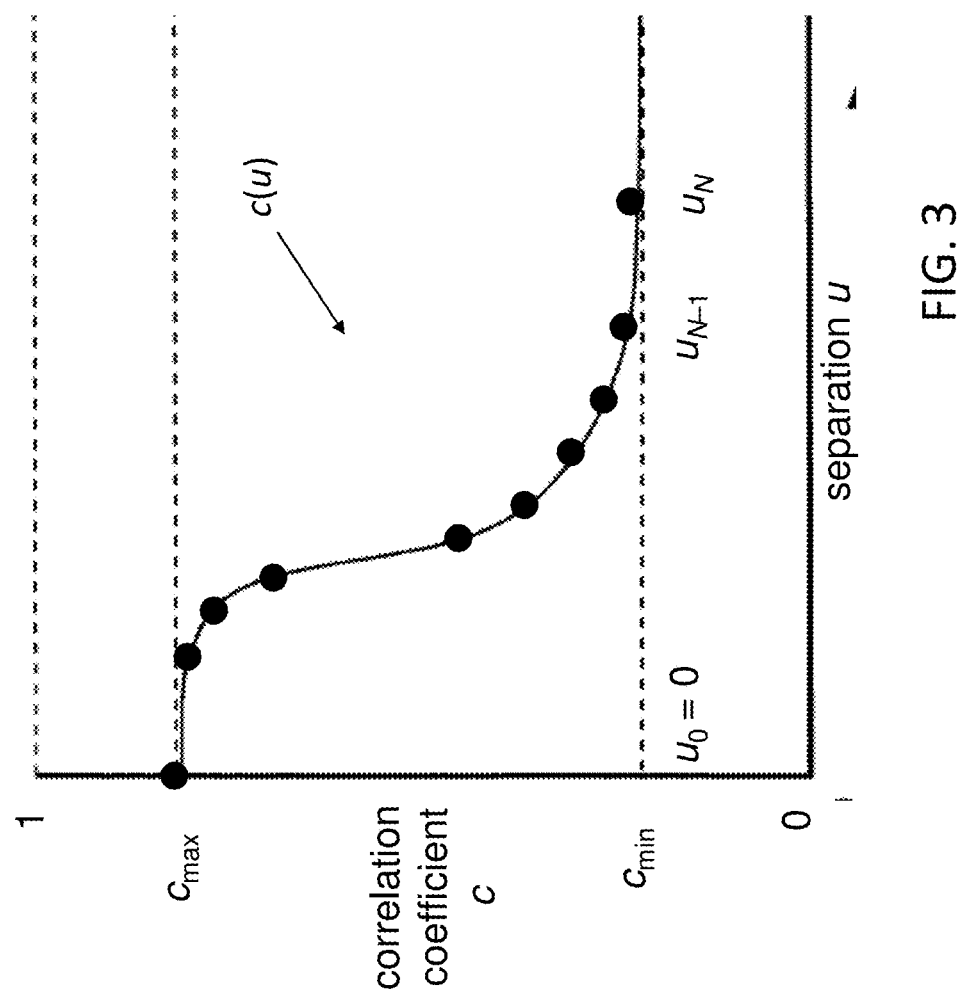
FIG. 3 shows correlation coefficient used to characterize spatial correlation in integrated circuit development according to an exemplary embodiment of the invention.

FIG. 3 shows that a set of correlation coefficients c among semiconductor devices for different device separations is used to form a continuous spatial correlation relation in integrated circuit development according to an exemplary embodiment of the invention. Specifically, FIG. 3 shows continuous spatial correlation values (obtained at block 210, FIG. 2), meaning that the correlation coefficients are not limited to particular locations of the integrated circuit. Instead, for any device separation u within the integrated circuit 120, there is a specified correlation coefficient c. A spatial correlation function c(u) is shown with the separation distance u indicated along one axis and the correlation coefficient c (i.e., value of the spatial correlation function) shown along a perpendicular axis. One-dimensional separation of two of the same device 125 (e.g., two ring oscillators) is considered such that $u=x_i-x_j$, with $x_i$ and $x_j$ respectively being the locations along the x-axis of the two devices 125 whose correlation coefficient c is provided. The value of a correlation coefficient c between two devices 125 is invariant when the order of the devices is exchanged, and thus $c(u)=c(-u)$. In addition, the value of correlation coefficient c does not increase with increasing device separation (i.e., either decrease or stay the same). Due to device mismatch (i.e., the statistical average of the square of the difference between the physical or electric parameters of two adjacent devices 125 is not zero), the correlation coefficient between two adjacent devices 125 is typically close to but smaller than one, $c(u \rightarrow 0) = c_{max} \leq 1$. Beyond a large separation $u_N$, the correlation coefficient c is treated as a constant. Namely, when $u \geq u_N$, $c = c_{min} \geq 0$.

Based on the maximum correlation value $c_{max}$ and the minimum correlation value $c_{min}$, the total variation (represented by total standard deviation $\sigma$) of a physical or electric parameter of a device 125 can be decomposed into three components: a fully correlated variation component, a partially correlation variation component, and a completely uncorrelated variation component. A fully correlated (i.e., chip mean or global) variation component is represented by its standard deviation $\sigma_{cm}$, which is independent of device separation. Chip mean variation causes parameter values of all devices 125 on the integrated circuit 120 to vary in a fully correlated fashion. A partially correlated (i.e., across-chip) variation component is represented by its standard deviation $\sigma_{acv}$, and the value of the component depends on device separation u. A completely uncorrelated (i.e., device mismatch) variation component is represented by the standard deviation $\sigma_{m0}$ of mismatch, which is independent of device separation u. The decomposition can be represented as:

$$\sigma^2 = \sigma_{cm}^2 + \sigma_{acv}^2 + \frac{1}{2}\sigma_{m0}^2 \qquad [\text{EQ. 1}]$$

In EQ. 1:

$$\sigma_{cm} = \sigma\sqrt{c_{min}}, \qquad [\text{EQ. 2}]$$

$$\sigma_{acv} = \sigma\sqrt{c_{max} - c_{min}}, \qquad [\text{EQ. 3}]$$

$$\sigma_{m0} = \sigma\sqrt{2(1 - c_{max})}. \qquad [\text{EQ. 4}]$$

The spatial correlation function c(u) can be similarly decomposed into three components: the contribution from the fully correlated variation component (a distance independent term), the contribution from partially correlated variation component (a distance dependent term), and the contribution from mismatch (completely uncorrelated variation component), which is always zero. That is, the spatial correlation function can be re-written as:

$$c(u) = \frac{\sigma_{cm}^2 + \sigma_{acv}^2 h(u)}{\sigma^2}. \quad [\text{EQ. 5}]$$

In EQ. 5, h(u) is a normalized one-dimensional correlation function in the space of device separation u. It varies between 0 and 1, and reaches 0 and 1 (0≤h(u)≤1). In terms of $\sigma_{cm}$ and $\sigma_{acv}$, the spatial correlation has the following limiting values:

$$c(u \to \infty) = c_{min} = \frac{\sigma_{cm}^2}{\sigma^2}, \quad [\text{EQ. 6}]$$

$$c(u \to 0) = c_{max} = \frac{\sigma_{cm}^2 + \sigma_{acv}^2}{\sigma^2}. \quad [\text{EQ. 7}]$$

In the example shown in FIG. 3, EQ. 6 becomes $$c(u \geq u_N) = c_{min} = \frac{\sigma_{cm}^2}{\sigma^2}.$$

To be clear, the correlation coefficient values shown in FIG. 3 are provided but the normalized correlation function h(u) must be calculated from the given correlation values c as discussed using the equations above.

Continuing with the exemplary one-dimensional case, determining a corresponding spatial correlation F(g) (at block 220, FIG. 2) as a function of the inverse of device separation, parameter g, is as a parameterized integration. The integration is over whole device separation u with the integrand being a product of the original spatial correlation, a trigonometric function whose argument is the product of the device separation u and a parameter g representing an inverse of device separation, and a normalization constant. That is, F(g) is given by:

$$F(g) = \frac{1}{2\pi} \int_{-\infty}^{+\infty} h(u)\cos(gu)du. \quad [\text{EQ. 8}]$$

The correlation function in the space of the inverse of device separation F(g) also exhibits a symmetric relation such that F(g)=F(-g), as can be seen in EQ. 8. Once F(g) is determined, one embodiment of determining statistical parameter P based on location (at block 240, FIG. 2) is as follows:

$$P(x_i) = \quad [\text{EQ. 9}]$$
$$\mu + \sigma_{cm}G_0 + \frac{1}{\sqrt{2}}\sigma_{m0}g_i + \sigma_{acv}[G_1\cos(G_3 x_i) + G_2\sin(G_3 x_i)].$$

In EQ. 9, μ is the mean value of the statistical parameter $P(x_i)$, each of $G_0$, $G_1$, $G_2$, and $g_i$ for i=1, 2, 3, . . . , N is an independent random variable with a mean of 0 and a standard deviation of 1. In addition, $G_3$ is also an independent random variable with a mean of zero, and the distribution of the random variable $G_3$ has a probability density distribution that is defined by F(g).

Another embodiment of determining statistical parameter P based on location (at block 240, FIG. 2) can be:

$$P(x_i) = G_4 + g_{i,0} + G_5\cos(G_3 x_i) + G_6\sin(G_3 x_i) \quad [\text{EQ. 10}]$$

where each of $G_3$, $G_4$, $G_5$, $G_6$, and $g_{i,0}$ for i=1, 2, 3, . . . , N is an independent random variable. The mean value of $G_4$ is μ and its standard deviation is $\sigma_{cm}$. The mean value of each of $G_3$, $G_5$, $G_6$, and $g_{i,0}$ is zero. The standard deviation of both $G_5$ and $G_6$ is $\sigma_{acv}$.

Figure 4:
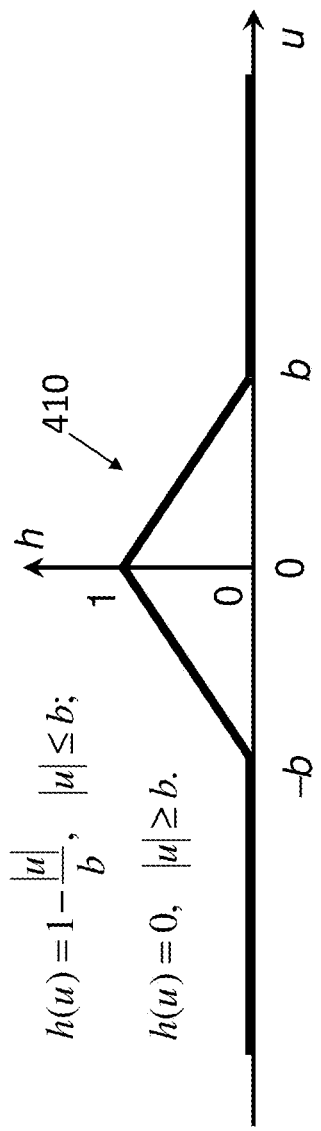
FIG. 4 shows an exemplary spatial correlation function in the space of device separation.
Figure 5:
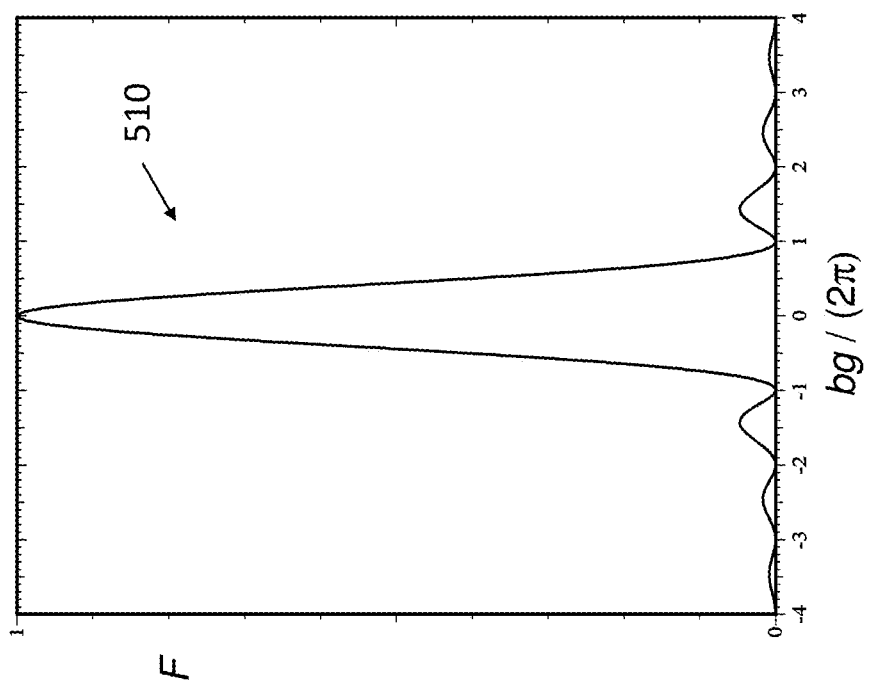
FIG. 5 shows a form of the spatial correlation function shown in FIG. 4 in the space of the inverse of the device separation.

FIGS. 4 and 5 illustrate the form of exemplary spatial correlation functions in the space of device separation u and in the space of the inverse g of the device separation, respectively. There are several differences between a spatial correlation function (as a function of device separation u) and its corresponding correlation function in the space of the inverse of the separation. In general, their forms are different. For a monotonically decreasing spatial correlation function (as a function of device separation), its corresponding form in the space of the inverse of the device separation can be either monotonic with increasing |g| or non-monotonic with increasing FIG. 4 shows spatial correlation as a function h(u) in the space of device separation u, and FIG. 5 shows the corresponding form of the spatial correlation in the space of the inverse g of device separation. As FIG. 4 indicates, the exemplary spatial correlation function 410 in the space of device separation u is a monotonically decreasing spatial correlation function with spatial correlation h(u)= 0 beyond b and −b (i.e., for |u|≥b). For this spatial correlation with a finite correlation range, the corresponding form F(g) in the space of the inverse of the device separation is shown in FIG. 5. FIG. 5 shows an exemplary form F(g) 510 in the space of the inverse of the device separation for the exemplary spatial correlation function 410 (FIG. 4). As FIG. 5 shows, F(g) can be non-zero for large values of |g|.

The previous discussion on spatial correlation in one-dimensional space x can be extended to two-dimensional space (x, y). As previously noted, $u=x_i-x_j$. In addition, $v=y_i-y_j$ with ($x_i$, $y_i$) being the location of the ith device and ($x_j$, $y_j$) being the location of the jth device (devices 125 in FIG. 1) whose correlation coefficient c is provided. A two-dimensional correlation function c(u, v) can also be decomposed into the form of:

$$c(u, v) = \frac{\sigma_{cm}^2 + \sigma_{acv}^2 h(u, v)}{\sigma^2}. \quad [\text{EQ. 11}]$$

Similar to the one-dimensional case, the standard deviations $\sigma_{cm}$ and $\sigma_{acv}$ in EQ. 11 are determined by EQ. 2 and EQ. 3, and h(u, v) is a normalized two-dimensional correlation function. An embodiment of determining statistical parameter P based on two-dimensional location (at block 240, FIG. 2) is as follows:

$$P(x_i, y_i) = \mu + \sigma_{cm}G_0 + \frac{1}{\sqrt{2}}\sigma_{m0}g_i + \quad [\text{EQ. 12}]$$
$$\sigma_{acv}[G_1\cos(G_3 x_i + G_4 y_i) + G_2\sin(G_3 x_i + G_4 y_i)],$$
$$i = 1, 2, 3, \ldots, N.$$

As noted with reference to the one-dimensional case, μ is the average value of the statistical parameter $P(x_i,y_i)$, and each of $G_0$, $G_1$, $G_2$, and $g_i$ (i=1, 2, 3, . . . , N) in an independent random variable with a mean of 0 and a standard deviation of 1. In the two-dimensional case, each of $G_3$ and $G_4$ is an independent random variable with a mean of 0, and the joint distribution of the two random variables $G_3$ and $G_4$ has a joint probability density distribution that is defined by $F(G_3, G_4)$. Specifically, $$F(G_3, G_4) = \frac{1}{(2\pi)^2} \int_{-\infty}^{+\infty} du \int_{-\infty}^{+\infty} dv h(u, v) \cos(G_3 u) \cos(G_4 v). \quad [\text{EQ. 13}]$$

Figure 6:
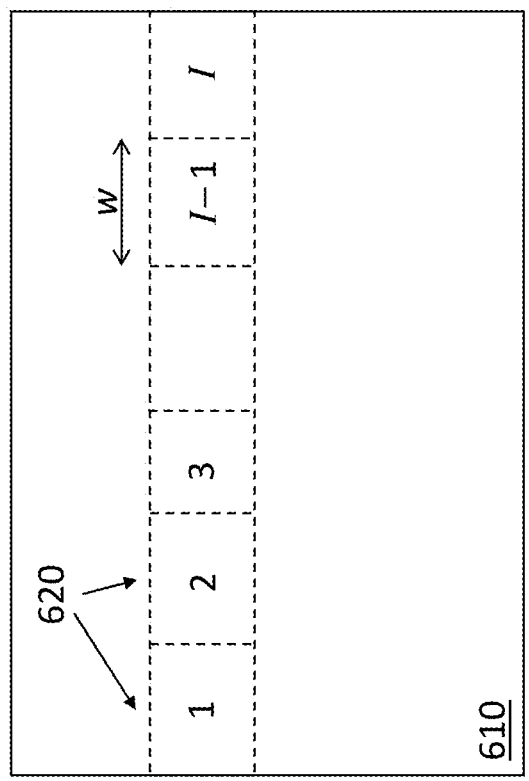
FIG. 6 shows a block-based approach used to characterize spatial correlation among semiconductor devices or among logic gates in integrated circuit development according to another exemplary embodiment of the invention.

FIG. 6 shows a block-based approach used to characterize spatial correlation in integrated circuit development according to another exemplary embodiment of the invention. FIG. 6 involves discrete rather than continuous correlation coefficient values and also involves a block-based approach rather than the continuous correlation function approach, as previously discussed. An exemplary layer 610 of the multilayer integrated circuit 120 is shown. The layer 610 is divided into multiple blocks 620, and one row of blocks numbered from 1 to I is shown. Each block has a width w and can include multiple devices 125 within it. The correlation coefficient between a physical or electric parameter of a device 125 in the ith block 620 and that of a device 125 in the jth block 620 is denoted as $c_{i,j}$, whose value only depends on the difference between i and j usually, i.e., $c_{i,j} = r_{i-j}$. Among all correlation coefficients $c_{i,j}$, there is a maximum value ($c_{max}$) and a minimum value ($c_{min}$). The maximum value $c_{max}$ usually occurs between two devices located in a same block 620, $c_{max} = c_{i,i} = r_0$. Due to the existence of device mismatch, the maximum value is less than unity usually, $c_{max} < 1$. In general, the value of discrete correlation coefficient $c_{i,j}$ does not increase with increasing block separation |i−j| (i.e., either decrease or stay the same).

Similar to the continuous case, the objective in the discrete case is to find a suitable representation for all statistical parameters $P_1, P_2, \ldots, P_I$ such that, after a statistical average, the mean value of parameter $P_i$ will be exactly μ, the standard deviation of parameter $P_i$ will be exactly σ, the correlation coefficient between parameters $P_i$ and $P_j$ will be exactly the value of given $c_{i,j}$. To achieve this, the total variation is decomposed into a fully correlated variation component, a partially correlated variation component, and a completely uncorrelated component. Similar to EQ. 5, the correlation coefficients in the discrete case can be re-written as:

$$c_{ij} = \frac{\sigma_{cm}^2 + \sigma_{acv}^2 H_{i-j}}{\sigma^2}, \quad [\text{EQ. 14}]$$
$$i \neq j,$$
$$i, j = 1, 2, \ldots, I.$$

In EQ. 14, the first term represents fully correlated part of correlation $c_{ij}$, and the second term represents the partially correlated part of correlation $c_{ij}$. Further, $H_{i-j}$ is a normalized and discrete one-dimensional spatial correlation function: $H_0 = H_{max} = 1$ (where $c_{i,i} = c_{max} = 1$), and $H_{min} = 0$ (when $c_{i,j} = c_{min}$).

In one embodiment, the statistical parameter of the nth device in block i (at block 240, FIG. 2) can be represented as:

$$P_i(\text{device } n) = \mu + \sigma_{cm} G_0 + \sigma_{acv} \sum_{k=-M}^{M} a_k g_{i+k} + \frac{1}{\sqrt{2}} \sigma_{m0} g_{i,n}. \quad [\text{EQ. 15}]$$

Again, μ is the average value of the statistical parameter $P_i$(device n), and each of $G_0$, $g_i$ (i=−M+1, −M+2, …, −1, 0, 1, 2, 3, …, I−1, I, I+1, …, I+M−1, I+M) and $g_{i,n}$ (i=1, 2, 3, …, I, n=1, 2, 3, …) is an independent random variable with a mean of 0 and a standard deviation of 1. M is a positive integer, and the larger the value of M, the smoother the discrete spatial correlation function (EQ. 14). To achieve a distance-dependent correlation behavior, the statistical parameter $P_i$ (device n) needs to contain at least two block-based and weighted random terms ($a_k g_{i+k}$). In the symmetric representation EQ. 15, the minimum value of M is 1. When M=1, there are three block-based and weighted random terms ($a_{-1} g_{i-1}$, $a_0 g_i$, and $a_1 g_{i+1}$) in EQ. 15.

In another embodiment, the statistical parameter of the nth device in block i (at block 240, FIG. 2) can also be represented as:

$$P_i(\text{device } n) = G_4 + \sum_{k=-M}^{M} a_k G_{i+k,0} + \frac{1}{\sqrt{2}} \sigma_{m0} g_{i,n} \quad [\text{EQ. 16}]$$

where each of $G_4$, $G_{i,0}$ (i=−M+1, −M+2, …, −1, 0, 1, 2, 3, …, I−1, I, I+1, …, I+M−1, I+M) and $g_{i,n}$ (i=1, 2, 3, …, I, n=1, 2, 3, …) is an independent random variable. The mean value of $G_4$ is μ and its standard deviation is $\sigma_{cm}$. The mean value of each of $G_{i,0}$ and $g_{i,n}$ is zero. The standard deviation of each $G_{i,0}$ is $\alpha_{acv}$.

To satisfy the relation $H_0 = 1$, the weights $a_k$ for k=−M, −M+1, …, −1, 0, 1, 2, 3, …, M−1, M need to satisfy a normalization relation, $$\sum_{k=-M}^{M} a_k^2 = 1. \quad [\text{EQ. 17}]$$

In this representation, the normalized discrete spatial correlation function is given by:

$$H_m = H_{-m} = \sum_{k=-M}^{M-m} a_k a_{m+k}. \quad [\text{EQ. 18}]$$

In EQ. 18, m=0, 1, 2, …, I−2, I−1. When the separation between two blocks is (2M+1) or larger, the partially correlated part of the correlation vanishes. That is:

$$H_m = 0, |m| \geq 2M + 1. \quad [\text{EQ. 19}]$$

The weights $a_k$ in EQ. 15 or in EQ. 16 can be determined using:

$$a_k = C \int_{-\infty}^{+\infty} \sqrt{\max[F(g), 0]} \cos(kwg) dg. \quad [\text{EQ. 20}]$$

In EQ. 20, F(g) is the spatial correlation in the space of the inverse g of device separation, as determined by EQ. 8. In the discrete case here, the function h(u) in EQ. 8 satisfies the relation $h(mw) = H_m$ at discrete points u=mw, where m is an integer. The value of the normalization constant C is determined by EQ. 17.

Like extending the method of modeling one-dimensional continuous spatial correlation problem to the method of modeling two-dimensional continuous spatial correlation problem, the method of modeling one-dimensional discrete spatial correlation problem can be extended to a method of modeling two-dimensional discrete spatial correlation, where the whole chip region is divided into multiple smaller regions with an equal width and also an equal length, a case where devices 125 are in different rows of blocks 420 *i*.

According to one or more embodiments of the invention and based on the processes shown in FIG. 2 and discussed previously, more accurate parameter values can be obtained for devices 125 of the integrated circuit. This increased accuracy in the parameter values that is facilitated by characterizing the spatial correlation results in increased accuracy in the testing performed on the integrated circuit design. Accordingly, characterization of spatial correlation in integrated circuit development according to one or more embodiments of the invention result in a higher performance integrated circuit 120.

Figure 7:
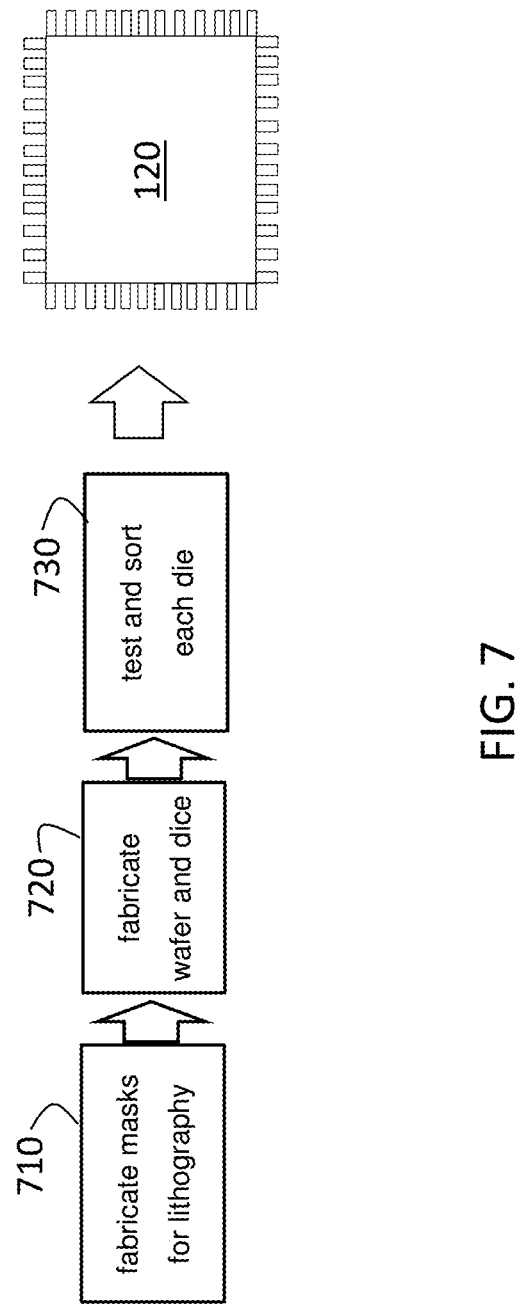
FIG. 7 is a process flow of a method of fabricating the integrated circuit designed according to one or more embodiments of the invention.

FIG. 7 is a process flow of a method of fabricating the integrated circuit 120 designed according to one or more embodiments of the invention. Once all the devices 125 of the integrated circuit 120 are placed and their parameter values, determined based on characterization of spatial correlation according to one or more embodiments of the invention, are used to successfully perform testing (e.g., timing analysis, noise analysis, power consumption analysis), the processes shown in FIG. 7 can be performed to fabricate the integrated circuit 120. Generally, a wafer with multiple copies of the final design is fabricated and cut (i.e., diced) such that each die is one copy of the integrated circuit 120. At block 710, the processes include fabricating masks for lithography based on the finalized physical layout. At block 720, fabricating the wafer includes using the masks to perform photolithography and etching. Once the wafer is diced, testing and sorting each die is performed, at block 730, to filter out any faulty die.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of applying spatial correlation in integrated circuit development, the method comprising:
    placing devices of an integrated circuit design;
    obtaining, using a processor, spatial correlation values, each spatial correlation value indicating a correlation coefficient between a first device and a second device among the devices, wherein the first device and the second device are instances of a same device and the correlation coefficient is based on a device separation between the first device and the second device;
    determining, using the processor, a corresponding spatial correlation in the space of an inverse of device separation by integrating over the device separation with an integrand being a product of the spatial correlation values in the space of the device separation and a trigonometric function whose argument is a product of the device separation and a parameter representing the inverse of the device separation, wherein the device separation refers to one-dimensional or two-dimensional separation;
    determining, using the processor, a parameter value for the first device based on an average value of the parameter value and on the spatial correlation as the function of the inverse of the device separation;
    performing, using the processor, analysis of the integrated circuit design using the parameter value, wherein performing the analysis includes performing timing analysis, noise analysis, or power consumption analysis; and
    providing the integrated circuit design for fabrication into an integrated circuit based on finalizing the design according to the analysis.

2. The computer-implemented method according to claim 1, wherein the obtaining the spatial correlation values includes obtaining a continuous spatial correlation relation such that correlation coefficients are defined for every device separation within the integrated circuit.

3. The computer-implemented method according to claim 2, wherein the determining the parameter value includes using random numbers, wherein at least one of the random numbers has a probability density distribution defined by the spatial correlation as the function of the inverse of the device separation.

4. The computer-implemented method according to claim 1, wherein the obtaining the spatial correlation values includes obtaining a discrete spatial correlation relation that defines correlation coefficients at only a finite set of locations of the integrated circuit.

5. The computer-implemented method according to claim 4, further comprising dividing the integrated circuit design into blocks of equal width or equal area, wherein each of the blocks includes one or more devices.

6. The computer-implemented method according to claim 5, wherein the determining the parameter value is based on the block in which the first device is located.

7. A system to characterize spatial correlation in integrated circuit development, the system comprising:
a memory device configured to store an integrated circuit design that includes a placement of devices;
a processor configured to obtain spatial correlation values, each spatial correlation value indicating a correlation coefficient between a first device and a second device among the devices, wherein the first device and the second device are instances of a same device and the correlation coefficient is based on a device separation between the first device and the second device, to determine spatial correlation as a function of an inverse of device separation by integrating over the device separation with an integrand being a product of the spatial correlation values in the space of the device separation and a trigonometric function whose argument is a product of the device separation and a parameter representing the inverse of the device separation, wherein the device separation refers to one-dimensional or two-dimensional separation, to determine a parameter value for the first device based on an average value of the parameter value and on the spatial correlation as the function of the inverse of the device separation, and to perform analysis of the integrated circuit design using the parameter value, wherein the analysis includes timing analysis, noise analysis, or power consumption analysis and the integrated circuit design is provided for fabrication into an integrated circuit based on finalizing the design according to the analysis.

8. The system according to claim 7, wherein the spatial correlation values include a continuous spatial correlation relation such that correlation coefficients are defined for every device separation within the integrated circuit.

9. The system according to claim 8, wherein the processor is configured to determine the parameter value based on using random numbers at least one of the random numbers having a probability density distribution defined by the spatial correlation as the function of the inverse of the device separation.

10. The system according to claim 7, wherein the spatial correlation values include a discrete spatial correlation relation that defines correlation coefficients at only a finite set of locations of the integrated circuit.

11. The system according to claim 10, wherein the processor is further configured to divide the integrated circuit design into blocks of equal width, wherein each of the blocks includes one or more devices.

12. The system according to claim 11, wherein the processor is configured to determine the parameter value based on the block in which the first device is located.

13. A computer program product for applying spatial correlation in integrated circuit development, the computer program product comprising a computer readable storage medium having program instructions embodied therewith, the program instructions executable by a processor to perform a method comprising:
placing devices of an integrated circuit design;
obtaining spatial correlation values, each spatial correlation value indicating a correlation coefficient between a first device and a second device among the devices, wherein the first device and the second device are instances of a same device and the correlation coefficient is based on a device separation between the first device and the second device;
determining spatial correlation as a function of an inverse of device separation by integrating over the device separation with an integrand being a product of the spatial correlation values in the space of the device separation and a trigonometric function whose argument is a product of the device separation and a parameter representing the inverse of the device separation, wherein the device separation refers to one-dimensional or two-dimensional separation;
determining a parameter value for the first device based on an average value of the parameter value and on the spatial correlation as the function of the inverse of the device separation;
performing analysis of the integrated circuit design using the parameter value, wherein performing the analysis includes performing timing analysis, noise analysis, or power consumption analysis; and
providing the integrated circuit design for fabrication into an integrated circuit based on finalizing the design according to the analysis.

14. The computer program product according to claim 13, wherein the obtaining the spatial correlation values includes obtaining a continuous spatial correlation relation such that correlation coefficients are defined for every device separation within the integrated circuit.

15. The computer program product according to claim 14, wherein the determining the parameter value includes using random numbers, wherein at least one of the random numbers has a probability density distribution defined by the spatial correlation as the function of the inverse of the device separation.

16. The computer program product according to claim 13, wherein the obtaining the spatial correlation values includes obtaining a discrete spatial correlation relation that defines correlation coefficients at only a finite set of locations of the integrated circuit.

17. The computer program product according to claim 16, further comprising dividing the integrated circuit design into blocks of equal width, wherein each of the blocks includes one or more devices, and the determining the parameter value is based on the block in which the first device is located.

* * * * *